United States Patent [19]

Hobgood et al.

[11] 4,336,708
[45] Jun. 29, 1982

[54] PIPELINE LEAK LOCATOR

[76] Inventors: Terry W. Hobgood, 7726 Pella St., Houston, Tex. 77036; James C. Knox, Jr., 7043 Concho, Houston, Tex. 77074

[21] Appl. No.: 196,618

[22] Filed: Oct. 14, 1980

[51] Int. Cl.³ ...................... G01M 3/00; G01N 25/00
[52] U.S. Cl. .................................. 73/40.5 R; 73/204
[58] Field of Search ................ 73/40.5 R, 40, 15 FD, 73/190 H, 344, 49.1, 204

[56] References Cited

U.S. PATENT DOCUMENTS

| | | | |
|---|---|---|---|
| 1,906,636 | 5/1933 | Schlecker | 73/40.5 R |
| 3,020,760 | 2/1962 | Schnoll | 73/204 |
| 3,321,957 | 5/1967 | Blander et al. | 73/40.5 R |
| 3,375,702 | 4/1968 | Birman | 73/40 |
| 3,500,686 | 3/1970 | Bell | 73/204 |
| 3,543,578 | 12/1970 | Sampson | 73/204 |
| 3,851,521 | 12/1974 | Ottenstein | 73/40.5 R |
| 3,874,222 | 4/1975 | Ladd et al. | 73/40.5 R |
| 3,903,729 | 9/1975 | Covington | 73/40.5 R |
| 4,083,243 | 4/1978 | Cochran, Jr. | 73/204 X |
| 4,255,968 | 3/1981 | Harpster | 73/204 |

FOREIGN PATENT DOCUMENTS 54-156593 12/1979 Japan ................ 73/15 FD

*Primary Examiner*—Kyle L. Howell
*Assistant Examiner*—Joseph W. Roskos
*Attorney, Agent, or Firm*—Gunn, Lee & Jackson

[57] ABSTRACT

In the preferred and illustrated embodiment of a leak locating system, a pipeline leak locator is disclosed. The locator includes an electronic circuit having temperature sensors attachable to the pipeline and a time and temperature monitor. The system utilizes time and temperature differences to determine the direction and along with the known volume loss can determine the distance of a pipeline leak relative to the locator. The pipeline leak locator further includes a cooling coil for reducing the pipe wall temperature to a predetermined value in the area of the sensors.

11 Claims, 2 Drawing Figures

PIPELINE LEAK LOCATOR

BACKGROUND OF THE DISCLOSURE

This invention relates generally to pipelines and more particularly to a system and method for locating a leak or break in a pipeline containing fluid under pressure. This invention has particular application to pipelines containing liquid petroleum, gas products or water.

Today, in those industries involved in transporting fluids cross-country in pipelines, there exists a need for a method and apparatus which will quickly locate leaks or breaks in the pipeline. While a pipeline is an excellent, economical and efficient way to transport fluid material, leaks in the pipeline are a major problem and can be particularly dangerous in populated areas. In operating present day pipelines, leaks are generally detected by material balance. When the amount of fluid metered out of a pipeline segment is less than the amount metered in, leakage accounts for most of the disappearance. The prior art discloses methods and devices for locating and detecting leaks or breaks in a pipeline. However, the prior art devices are generally limited to detecting leaks in pipelines containing fluid or gas and utilize pressure differences to determine the occurrence and location of a leak. The prior art also includes devices wherein temperature changes are sensed for indicating leakage, but these devices do not utilize time and temperature differences to locate a leak in the pipeline as disclosed by the present invention.

SUMMARY OF THE DISCLOSURE

The present invention provides a method and system for locating a leak or break in a pipeline containing liquid or gas products. The locating system includes a leak locator comprising an electronic circuit having temperature sensors attachable to the pipeline, a time and temperature monitor and a cooling coil for reducing the pipe wall temperature in the area of the sensors. The monitor is preset to display elapsed time when a particular sensor reaches a predetermined temperature value.

When a pipeline is suspected of containing a leak, the suspected segment thereof is isolated by closing the valves at the ends of the segment and blind flanging them, or by cutting the particular pipe section from the pipeline and installing weld caps at both ends of the section. Other means of isolating the leaking section from the pipeline may be employed, as for example, by mechanical entry into the pipeline which will isolate the section that is leaking. A portion of the pipe section is excavated or otherwise exposed for attaching the locator device thereto. This initial excavation preferably exposes a portion at the midpoint of the section pipeline that is being tested. If more accurate data is to be determined, then two points of excavation must be made; one at a point downstream of the area suspected of leaking and one to the upstream of the leaking area. The segmented section of pipeline being tested must have some means of keeping pressure on the pipeline, either through pressure ports within valves or through mechanical entry into the pipeline. The fluid within the pipeline is isolated under pressure and, therefore, flows toward the leak or break in the line. The cooling coil attached to the pipe segment cools the fluid which, in turn, cools the pipe wall as it flows toward the leak. Thus, the direction of the leak relative to the locator device can be determined by observing which temperature sensor reaches the predetermined temperature first. The location of the leak is determined by interpreting the elapsed time values displayed by the time and temperature monitor. The elapsed time difference between adjacent temperature sensors closest to the leak is a function of the distance of the leak from the locator device, which distance may be determined from time difference data and from the leak rate. If the leak rate is not known, the leak distance or leak location may be found by the simultaneous use of an additional locator device installed at a general location such that the leak is known to be located between the devices. Thus, the device can be utilized to find a leak when the leak rate is known or when the leak rate is not known.

When the leak rate is not known, the invention of the present application may also be employed as a flow meter and the leak rate calculated. The volume flow through the pipe section is a function of velocity, distance, time and the cross-sectional area of the pipe section. The distance between temperature sensors is known and time is calculated by simply subtracting the elapsed time shown by two adjacent sensors.

It is, therefore, an object of the invention to provide a method and system for quickly locating a leak or break in a pipeline containing fluid. This is accomplished by a feature of the invention providing a cooling coil for reducing the temperature of a portion of the pipeline and subsequently sensing the temperature reduction in a particular direction from the cooling coil.

It is one feature of the invention to provide a method and system for determining the distance from the locator device that the leak exists. The distance can be calculated from the known volume loss within the test section and by interpreting the elapsed time differences between sensors of the locator device attached to the pipeline.

It is another object of the invention to provide a leak locating system that is adaptable to be utilized as a flow direction indicator. This is accomplished by a feature of the invention wherein pipe temperature change is displayed and the flow direction of the leak calculated.

It is yet another object of the invention to provide a leak locating system which is compact and easily transportable to remote locations along a pipeline route.

BRIEF DESCRIPTION OF THE DRAWINGS

So that the manner in which the above recited features, advantages and objects of the invention, as well as others which will become apparent, are attained and can be understood in detail, a more particular description of the invention briefly summarized above may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE PREFERRED EMBODIMENT

Figure 1:
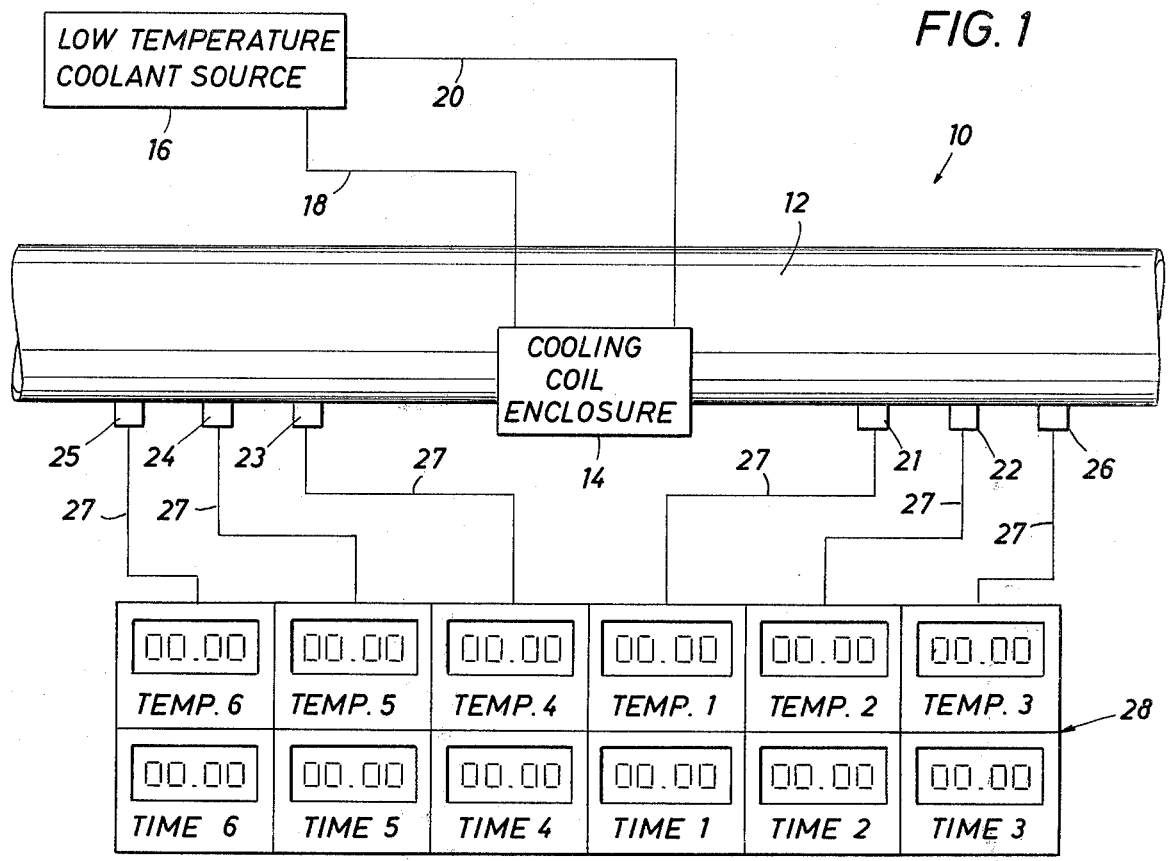
FIG. 1 is a schematic view showing a preferred embodiment of the invention applied to a pipeline to determine the location of a leak in the pipeline.

Referring first to FIG. 1, the invention is illustrated in connection with a pipeline 10 which carries a fluid. Any type of fluid may be transported through the pipeline, but, typically, the fluid is oil or gas. In such pipelines, the fluid is commonly moved by means of pumps (not shown) connected to the line. The pumps are spaced along the line and normally maintain the fluid at static pressures which may range from 200 to 1,200 psi. The pump stations are spaced along the line as required (perhaps 40.0 to 100.0 miles apart) to maintain the pipeline pressure and flow.

If a leak is suspected in a segment of the pipeline 10, the segment is isolated by closing valves (not shown) at each end thereof and blind flanging them. Other means of isolating the leaking section from the pipeline may be employed, as for example, by cutting the particular pipe section from the pipeline and installing weld caps at both ends of the section, or by some mechanical entry into the pipeline that will isolate the section that is leaking. A leak is typically indicated by a sharp drop in pipeline pressure above the drop in pressure normally associated with friction of the pipe wall. A leak may also be detected by material balance if the pipeline is provided with metering devices. At any rate, an indication is observed that a leak exists in the pipeline 10. The suspected segment can be very long. Once the suspected segment of the pipeline 10 is isolated, a section 12 of the line is exposed by excavation. Any portion may be exposed, however, it is preferred that the pipeline 10 be accessed at the midpoint of the shut-in segment of the pipeline.

The locator device which is attached to the exposed pipe section 12 comprises a cooling coil, a plurality of sensors and a time and temperature monitor. The cooling coil which is incorporated in a detachable cooling coil enclosure 14 is attached, if possible, to the bottom half of the pipe section 12. The enclosure 14 is preferably flexible so that the cooling coil may be snugly attached to different size pipes. Elastic or mechanical straps (not shown in the drawings) which can accommodate different size pipes are provided for holding the cooling coil enclosure 14 against the bottom of the pipe section 12. The cooling coil is connected to a coolant source 16 via inlet line 18 and outlet line 20 as shown in FIG. 1. Typically, the coolant source 16 includes a pump for pumping coolant through the cooling coil to cool the pipe section 12. It is a closed system operating in the manner of the air conditioning system of a car. Freon, for example, may be used as a coolant in the present invention. Other commercially available coolants may also be used.

After attaching the cooling coil enclosure 14, the temperature sensors 21, 22, 23, 24, 25 and 26 are attached to the bottom of the pipe section 12 in longitudinal alignment with the enclosure 14. The temperature sensors may be provided with elastic straps similar to the straps used to attach the enclosure 14, or they may be magnetically or mechanically attached to the pipe section 12. The sensors 21 and 23 are attached an equal distance on opposite sides of the enclosure 14. This distance is a function of the diameter of the pipe being tested. The sensors 21 and 23 must be sufficiently spaced from the enclosure 14 so that the cold radiating from the enclosure 14 does not influence the sensors. The temperature sensors 22 and 24 are subsequently attached to the pipe section 12 as shown in FIG. 1. The distance between the sensors 21 and 22 and the sensors 23 and 24 is substantially equal. Likewise, the distance between the sensors 24 and 25 and the sensors 22 and 26 is substantially equal. Wire lines 27 connect the temperature sensors to a monitor 28 which displays a temperature and time for each temperature sensor. The monitor 28 is set to begin displaying elapsed time as each sensor reaches a predetermined temperature value which is less than the beginning or ambient temperature of the pipe section 12. It is desirable that heat generating sources be minimized as a bias to testing. Uniform sun heating is permissible. Irregular shading is likely to bias the test. Adjacent heat sources are also avoided where possible. Fairly uniform insulation on the pipe 12 in the form of dirt, cathodic coating and the like is desirable.

Since the pipe section 12 is closed at both ends, the pressurized fluid in the pipeline moves toward and escapes from the break or leak in the line. The cooling system cools fluid ordinarily stagnant in the line. As the fluid which has been cooled by the cooling coil moves at some finite rate toward the leak, the cooled fluid cools the pipe section 12 to the preset temperature. By observing which temperature sensor reaches the preset temperature value first, the direction of the leak relative to the locator device can be determined. For example, of the sensor 21 reaches the preset temperature before sensor 23, the leak is to the right of the enclosure 14 in FIG. 1. When the sensor 21 reaches the preset temperature, the timer 1 which is associated with sensor 21 begins displaying elapsed time. Timer 2, associated with sensor 22, displays elapsed time when sensor 22 reaches the predetermined temperature. The difference in elapsed time between timer 1 and timer 2 is a function of the distance of the leak from the enclosure 14. For example, for leaks closer to the enclosure 14, a smaller elapsed time difference is obtained between sensor 21 and sensor 22. The location of the leak may be determined by a trial and error method by repeating the procedure hereinabove described at different locations of the pipeline until the leak is discovered. However, in the preferred method, the distance may be calculated as a function of the elapsed time difference between adjacent temperature sensors and the known volume of liquid or gas that is escaping from the isolated pipeline section. This volume may be converted to velocity (ft./sec.) as determined for the particular diameter pipeline being tested. The preset temperature is related to beginning or ambient temperature. On a hot day, the pipeline 12 might be very warm, say 100.0' F. The predetermined drop might be 5.0' F. On cold winter testing, the ambient temperature may be quite low; again, a drop of a few degrees is used to detect the leak.

Figure 2:
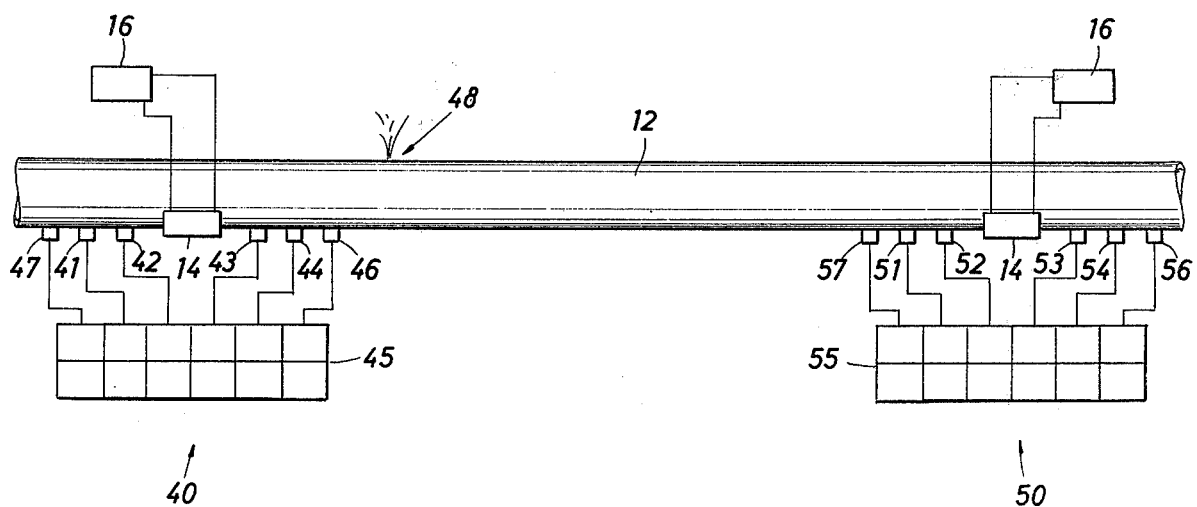
FIG. 2 is a schematic view showing two locator devices of the invention attached to a pipeline to determine the location of a pipeline leak to a more precise measurement.

Turning now to FIG. 2, an embodiment of the invention is shown whereby the location of a leak in a pipeline can be more accurately determined. In this embodiment, two identical locator devices are employed. The locator device 40 is attached to the pipe section 12 and monitored as described hereinbefore. The second locator device 50 is attached to the pipeline at a location known to be on the other side of the leak 48, near the valve isolating the segment 12, for example. The device 40 includes temperature sensors 41, 42, 43, 44, 46 and 47 which are connected to a monitor 45. Likewise, the device 50 includes temperature sensors 51, 52, 53, 54, 56 and 57 which are connected to a monitor 55. In FIG. 2, it has been observed that the leak 48 is to the right of the device 40. Therefore, the device 50 is attached to the right of the leak 48 as shown. In the example of FIG. 2, the elapsed time between the sensors 43 and 44 is less than the elapsed time between sensors 51 and 52 since the leak 48 is closer to the device 40. The exact location of the leak 48 can be determined by calculating the distance of the leak 48 from the device 40 as follows:

D = C pipe x $T_R$

D = Distance of leak from device in feet

C pipe = Slope of distance vs. temperature rate decline as empiracally determined.

$T_R$ = Observed temperature rate decline.

The sensor time differential is calculated by determining the difference in elapsed time between adjacent sensors and then calculating an average time differential. In this example, the pipe diameter coefficient and velocity are known. After calculating the sensor time differential, known values are substituted in the above formula to determine the distance of the leak 48 from the device 40.

It will be appreciated that the present invention is described as including a cooling coil for illustrative purposes only. It is understood that a heating coil may be utilized to change the temperature of a cold pipe. Since only a change in temperature of the pipeline is monitored, the method of creating a temperature change, whether it be heating or cooling the pipeline, is not critical. The pipe is presumed to be fairly uniform in heat conductivity. No great problem is encountered if the pipe wall conducts a temperature change to the nearer sensors, assuming that pipe wall heat conduction is equal in both directions. As a temperature change is propogated along the wall of the pipe from external sources, it will equally mask the sensed temperatures both upstream and downstream and, therefore, will cancel or null. Such cancellation does not obscure the temperature change from flow of the chilled stagnated fluid toward the leak.

If desired, multiple sensors can be placed around the pipe for a single location, and their readings can be averaged. For instance, a sun exposed pipeline can be encircled with sensors to average heating from the sun.

It will also be observed that the present invention may be employed as a flow meter when the velocity of fluid flow is not known. Flow rate may be calculated according to the following equation:

$Q = C_P (T_u - T_D)$

Q = Flow rate in gallons per minute $C_P$ = Pipe coefficient employing physical properties of pipe, pipe size, flowing fluid properties relating to heat transfer as empiracally derived.

$T_U$ = Temperature upstream of cooling device at stable condition of cooling and flow. (°F.).

$T_D$ = Temperature downstream of cooling device at stable conditions of cooling and flow (°F.).

While the foregoing is directed to the preferred embodiment of the present invention, other and further embodiments of the invention may be devised without departing from the basic concept thereof, and the scope thereof is determined by the claims which follow.

We claim:

1. A device for locating leaks in a pipeline carrying a fluid comprising:
   (a) means for changing the temperature of a pipeline section, said temperature changing means being selectably attachable at a selected location of the pipeline section;
   (b) a plurality of temperature sensors selectably attachable to the pipeline section, said temperature sensors being equally spaced from said temperature changing means along the length of the pipeline section; and
   (c) monitor means connected to said temperature sensors for monitoring change in the temperature of the pipeline section.

2. The apparatus of claim 1 wherein said temperature changing means is a cooling coil incorporated in a flexible enclosure for attachment to the pipeline section.

3. The apparatus of claim 2 wherein at least two temperature sensors are attached to the pipeline section on each side of said flexible enclosure.

4. The apparatus of claim 2 wherein said cooling coil is connected to a low temperature coolant source.

5. The apparatus of claim 1 wherein said monitor means includes timer means for monitoring elapsed time required for one of said plurality of temperature sensors to reach a preset temperature differential.

6. The apparatus of claim 5 wherein said monitor means displays temperature and elapsed time for each of said temperature sensors.

7. In a pipeline containing fluid under pressure, the method of locating a leak occurring in the pipeline including the steps of:
   (a) isolating a section of the pipeline suspected of including a leak;
   (b) changing the temperature at a part of a segment of the suspected pipeline section;
   (c) locating a plurality of temperature sensors to the pipeline segment near the temperature changing means;
   (d) monitoring the change in temperature of the pipeline segment; and
   (e) recording elapsed time for each of said temperature sensors after each of said sensors has reached a preset temperature value.

8. The method of locating a leak as in claim 7 further including the step of excavating a segment of the suspected pipeline section.

9. The method of locating a leak as in claim 7 further including the step of interpreting the elapsed time differential between adjacent temperature sensors for determining the location of the leak in the pipeline section.

10. The apparatus of claim 1, wherein said temperature changing means is a heating coil incorporated in a flexible enclosure for attachment to the pipeline section.

11. In a pipeline containing fluid under pressure, the method of determining fluid flow rate through the pipeline including the steps of:
   (a) isolating a section of the pipeline;
   (b) changing the temperature at a part of a segment of the suspected pipeline section;
   (c) locating a plurality of temperature sensors to the pipeline segment near the temperature changing means;
   (d) monitoring the change in temperature of the pipeline segment;
   (e) recording elapsed time for each of said temperature sensors after each of said sensors has reached a preset temperature value; and
   (f) calculating the flow rate of the fluid flowing through the pipeline.

* * * * *